United States Patent [19]

Wiley

[11] 4,346,388

[45] Aug. 24, 1982

[54] INK JET FLUID SUPPLY SYSTEM

[75] Inventor: Robert A. Wiley, Richardson, Tex.

[73] Assignee: The Mead Corporation, Dayton, Ohio

[21] Appl. No.: 159,016

[22] Filed: Jun. 13, 1980

[51] Int. Cl.[3] .................................. G01D 15/18

[52] U.S. Cl. .................................. 346/75; 210/137; 210/167; 346/140 R

[58] Field of Search ............. 346/75, 140 R; 210/137, 210/167

[56] References Cited

U.S. PATENT DOCUMENTS

| | | | |
|---|---|---|---|
| 1,843,242 | 2/1932 | Rafton . | |
| 1,876,439 | 9/1932 | Whaley . | |
| 2,454,259 | 11/1948 | Shadday . | |
| 3,322,283 | 5/1967 | Babunovic . | |
| 3,346,418 | 10/1967 | Chapman | 210/137 X |
| 3,353,678 | 11/1967 | Dragon . | |
| 3,389,797 | 6/1968 | Giardini | 210/167 X |
| 3,502,213 | 3/1970 | Kuribayashi . | |
| 3,701,998 | 10/1972 | Mathis | 346/75 |
| 3,761,953 | 9/1973 | Helgeson | 346/75 |
| 3,782,556 | 1/1974 | Murkes | 210/409 |
| 3,787,882 | 1/1974 | Fillmore | 346/75 |
| 3,840,120 | 10/1974 | Greenberg | 210/167 |
| 3,840,123 | 10/1974 | McClure | 210/167 X |
| 3,870,637 | 3/1975 | Miyoshi | 210/243 |
| 3,878,104 | 4/1975 | Guerrero | 210/323 |
| 3,911,818 | 10/1975 | MacIlvaine | 346/75 X |
| 3,929,071 | 12/1975 | Cialone | 346/75 X |
| 4,011,157 | 3/1977 | Pennebaker | 346/140 X |
| 4,042,503 | 8/1977 | Justus | 210/137 X |
| 4,048,067 | 9/1977 | Cheng | 210/73 R |
| 4,061,574 | 12/1977 | Clark | 210/321 R |
| 4,079,384 | 3/1978 | Tarano | 346/140 R |
| 4,084,165 | 4/1978 | Skafvenstedt | 346/140 R |
| 4,089,007 | 5/1978 | Perry | 346/140 R |
| 4,186,100 | 1/1980 | Mott | 210/510 X |
| 4,270,133 | 5/1981 | Shimazawa | 346/140 R |

FOREIGN PATENT DOCUMENTS 1546908 5/1979 United Kingdom .

*Primary Examiner*—Joseph W. Hartary

*Attorney, Agent, or Firm*—Biebel, French & Nauman

[57] ABSTRACT

A fluid supply system for an ink jet print head includes a recirculating path through a fluid pump, an inertial filter, and a variable restriction valve. Filtrate effluent from the inertial filter passes from the recirculating fluid path through a fixed restriction to the fluid supply line for the print head. The pressure drop across the fixed restriction is monitored and is utilized to control adjustment of the variable restriction valve in the recirculating fluid path such that the flow rate to the print head supply line is held constant. By this arrangement, the fluid within the print head may be maintained at a constant pressure level without the need for a pressure monitoring device directly associated with the print head.

12 Claims, 3 Drawing Figures

10
12
14
16
18
20
22
24
26
28
30
32
34
36
38
40
42
44
46
48
50
52
54
56
58
60
62
64
65
66
68
72
74
76
78
80
82
84
86
88
90
92
94
96
98
100
102
106
108
W
P

INK JET FLUID SUPPLY SYSTEM

BACKGROUND OF THE INVENTION

The present invention relates to a fluid supply system and, more particularly, to a system for filtering fluid to an ink jet print head at a substantially constant flow rate.

Typically, an ink jet printer, such as of the type shown in U.S. Pat. No. 3,701,998, issued Oct. 31, 1972, to Mathis, produces a plurality of jet drop streams which are directed at a print receiving medium for depositing drops on the medium in a predetermined pattern, thus producing collectively a print image on the print medium. A print head, defining a fluid receiving reservoir, receives ink under pressure such that the ink flows through a plurality of orifices defined by an orifice plate communicating with the reservoir, thereby producing the jet drop streams. The drops in these jet drop streams may be selectively charged, with charged drops being deflected by an electrostatic field to one or more catchers. Uncharged drops are not deflected and, therefore, strike the print receiving medium. By appropriate selective charging of the drops, the desired image may be formed on the medium.

Most ink jet printers include an ink supply system having an arrangement for reusing ink which is caught by the printer catchers. Since the environment in which an ink jet printer operates typically includes substantial amounts of dust and other particles, it will be appreciated that such particles may contaminate the ink returned from the catchers to the ink supply system. It is necessary, therefore, to provide for filtering the ink prior to supplying it to the print head.

Additionally, it is important that the ink be supplied to the print head under a substantially constant pressure. Prior art printers, such as that shown in Mathis, have typically included a pressure gauge or other pressure measuring means communicating directly with the print head reservoir. This may be somewhat disadvantageous in that ink particles and contaminate particles may tend to accumulate around the pessure gauge and thereafter be dislodged into the ink as larger particles may cause clogging of the orifices. While this problem may be eliminated by measuring the pressure of the ink further upstream in the ink supply system, if filters between the print head reservoir and the point at which the pressure measurement is made become partially blocked, the pessure measurement will not provide an accurate indication of the actual ink pressure in the print head.

A number of ink supply systems have been developed in the past for use with ink jet printers. One such system, disclosed in U.S. Pat. No. 3,761,953, issued Sept. 25, 1973, to Helgeson, provides for continuous ink recirculation through the supply system. Ink is supplied to the jet printer from a pressure reservoir which, in turn, is supplied from a fluid pump. Overflow from the pressure reservoir is continuously returned to the pump. Additionally, a filter is provided in the recirculating ink path from the pump to the pressure vessel to filter particles from the ink.

U.S. Pat. No. 4,011,157, issued Mar. 8, 1977, to Pennebaker et al., discloses an ink jet supply system including an arrangement by which impurities contaminating recirculating ink are removed by subjecting the contaminated ink to ultrasonic energy to form an ink aerosol. The aerosol is entrained in an air stream and carried to an impactor where it is caused to return to a liquid state. Ink is then supplied from the impactor to the printer. The aerosol which is produced is said to be substantially free of impurities greater than 1 micron in size.

U.S. Pat. No. 4,079,384, issued Mar. 14, 1978, to Takano et al., discloses an ink supply system for an ink jet printer having a recirculating ink path incorporating a pump, a main filter, and an ink reservoir. Ink is diverted from this recirculating path to the ink jet printer by means of an electromagnetic cross valve. None of the above noted ink supply systems incorporates an arrangement by which the ink flow to the print head from the recirculating ink path may be regulated. Additionally, these references do not suggest monitoring print head fluid pressure other than by measuring pressure directly in the print head or in the print head supply line.

Other ink jet supply systems incorporate nonrecirculating pump and filter devices which supply the print head. Such an arrangement is disclosed in U.S. Pat. No. 3,929,071, issued Dec. 30, 1975, to Cialone et al. Ink, which is collected in a gutter associated with the ink jet nozzle, is returned to an ink supply bottle for reapplication to the nozzle. The ink is therefore filtered only once during each passage through the system and the ink in the supply system is not moving when the printer is not in operation. This may create undesired deposit of particle contaminants at various points in the system.

Other fluid supply systems, not specifically designed for use with an ink jet printer, have included a recirculating fluid loop between a pump, filter, and fluid reservoir for continuously circulating fluid through the filter. Fluid is removed from this loop as required. As shown in U.S. Pat. No. 3,389,797, issued June 25, 1968, to Giardini, and U.S. Pat. No. 3,502,213, issued Mar. 24, 1970, to Kuribayashi, such systems have included a centrifugal filter in which a mainstream fluid path is provided through the filter along the surface of a filter element. Filtrate passes through the filter element and is thereafter removed from the supply loop while the mainstream effluent washes the surface of the filter element. Additionally, any particles carried by the unfiltered fluid generally have sufficient inertia such that they are not drawn through the filter element. The Giardini and Kuribayshi systems, however, do not provide for control of the filtered fluid output of the system.

Accordingly, it is seen that there is a need for a fluid supply system for an ink jet printer in which fluid is continuously recirculated through a supply loop including a filter, and in which the fluid is controllably removed from the supply loop and applied to the print head of the printer.

SUMMARY OF THE INVENTION

A system for supplying fluid to the fluid supply line of an ink jet system includes a fluid reservoir, and a pump means having a pump inlet, connected to receive fluid from the fluid reservoir, and a pump outlet. A filter means, including a mainstream influent inlet, a mainstream effluent outlet, and a filtrate effluent outlet, is provided for filtering a portion of the fluid passing between the mainstream influent inlet and the mainstream effluent outlet. The filter means provides the fluid so filtered to the filtrate effluent outlet. The mainstream influent inlet is connected to the pump outlet of the pump means. A variable restriction means is connected between the mainstream fluid outlet and the pump inlet for controllably restricting flow therebetween in response to a restriction control signal. A flow measuring means is provided for connecting the filtrate effluent outlet of the filter means to the fluid supply line of the ink jet printer and for providing a flow signal in response to fluid flow therethrough. A means is provided for comparing the flow signal and a reference signal and providing the restriction control signal to the variable restriction means, whereby flow is restricted sufficiently through the variable restriction means to provide substantially uniform fluid flow to the fluid supply line.

The pump means may comprise a second filter connected to the pump outlet, and a pump, connected to the pump inlet, providing fluid to the second filter, whereby fluid circulating through the filter means, the variable restriction means, and the pump means, is continuously filtered.

The filter means may comprise an inertial filter, including a filter casing defining the mainstream influent inlet, the mainstream effluent outlet, and the filtrate effluent outlet. The inertial filter may further include a hollow cylindrical filter element of porous material extending between the mainstream influent inlet and the mainstream effluent outlet and defining a mainstream fluid path therebetween. The filter element and the filter casing define a filtrate chamber surrounding the filter element. The filtrate effluent outlet communicates with the filtrate chamber, whereby a portion of the fluid supplied to the mainstream influent inlet passes outward through the filter element to the filtrate effluent outlet and is filtered by the filter element. The nonfiltered fluid and particles carried thereby pass out of the filter means through the mainstream effluent outlet.

Other objects and advantages of the invention will be apparent from the following description, the accompanying drawings and the appended claims.

DETAILED DESCRIPTION OF THE PREFERRED EMBODIMENT

Figure 1:
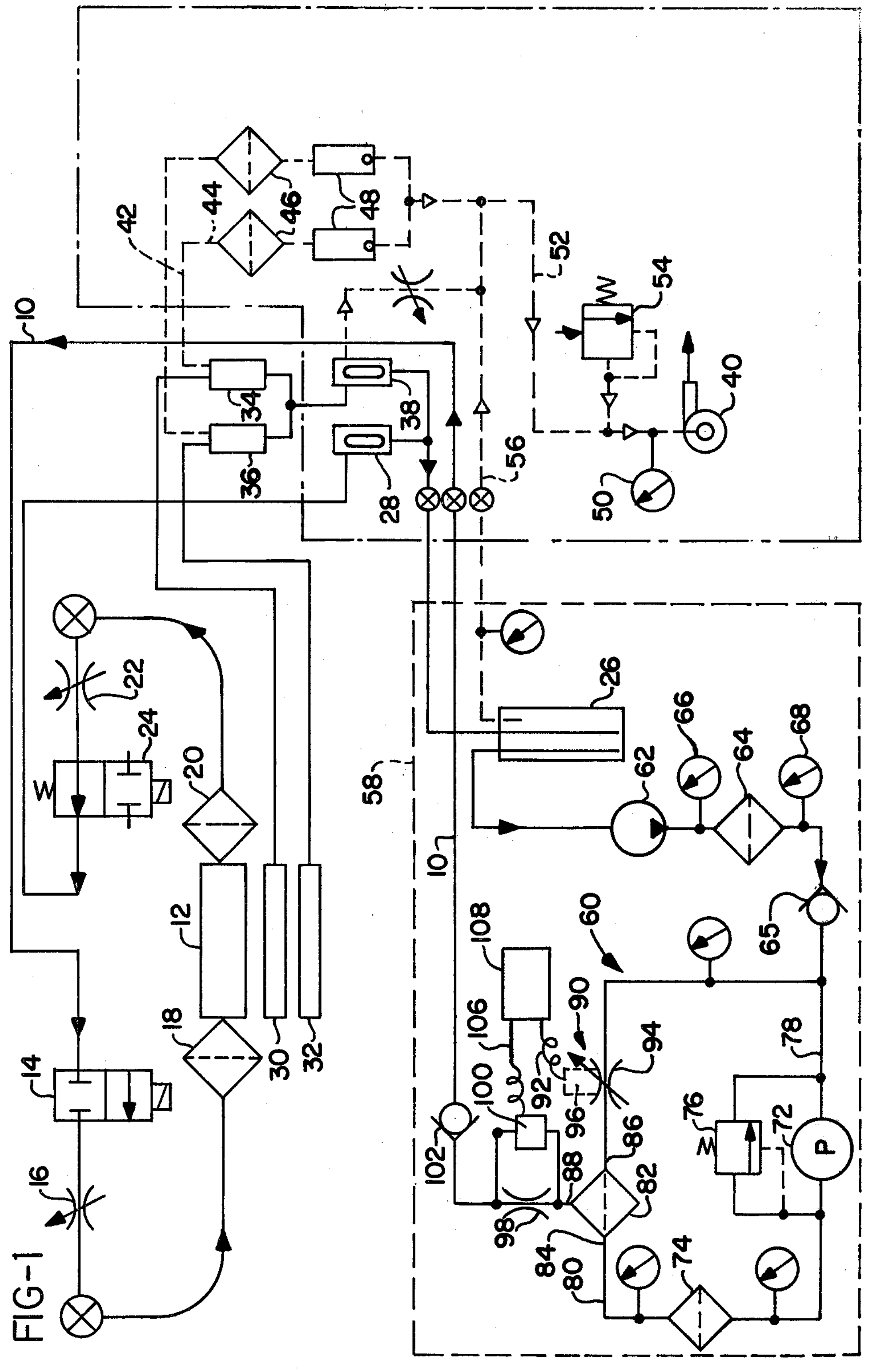
FIG. 1 is a schematic repesentation of the fluid supply system of the present invention.

Reference is made to FIG. 1 which illustrates the fluid supply system of the present invention. Ink is supplied through a supply line 10 to the ink jet printer head 12 of conventional design via solenoid valve 14, manually adjustable inlet regulating valve 16, and inlet filter 18. Ink may be removed from the print head 12 through outlet filter 20, manually adjustable outlet regulating valve 22, and outlet solenoid valve 24, and supplied to fluid reservoir or accumulator means 26 via float valve 28. It will be appreciated that during normal printing operations, solenoid valve 14 will be open while solenoid valve 24 will be closed, such that fluid is supplied to the print head 12 under pressure to produce a plurality of ink jet drop streams.

Drops from the jet drop streams which are not directed to the print receiving medium are caught by catchers 30 and 32. The ink accumulated within catchers 30 and 32 is returned to fluid reservoir 26 via charge decouplers 34 and 36, respectively, and float valve 38. Charge decouplers 34 and 36 are disclosed more fully in copending aplication Ser. No. 150,130, filed May 15, 1980, by Wiley et al., assigned to the assignee of the present invention. A vacuum is supplied from the vacuum pump 40 to decouplers 34 and 36 via vacuum lines 42 and 44. Vacuum lines 42 and 44 are connected to filters 46. Filters 46, in turn, are connected to pump 40 via flow meter valve 48. A pressure gauge 50 is provided to monitor pressure in vacuum pump line 52 and vacuum relief valve 54 is connected to line 52 to ensure that the vacuum does not exceed a predetermined vacuum setting. Vacuum is also supplied to fluid reservoir 26 via vacuum line 56.

The ink supply system 58 includes fluid reservoir or accumulator 26 which receives ink both from catchers 30 and 32 and from the print head 12, when solenoid 24 is opened, as discussed above. Reservoir 26 supplies ink to a recirculating ink supply path, indicated generally at 60, via charge pump 62, filter 64, and check valve 65. Pressure gauges 66 and 68 are provided to monitor the pressure drop across filter 64. The recirculating ink supply path 60 includes a fluid pump means, comprising pump 72, filter 74, and pressure relief valve 76. The pump means has a pump inlet 78 connected to receive fluid from the fluid reservoir 26, and a pump outlet 80.

A filter means 82 includes a mainstream influent inlet 84, a mainstream effluent outlet 86, and a filtrate effluent outlet 88. The filter means 82 filters a portion of the fluid passing between the mainstream influent inlet 84 and the mainstream effluent outlet 86 and provides the fluid so filtered to the filtrate effluent outlet 88. A variable restriction means 90 is connected to the mainstream effluent outlet 86 and the pump inlet 78 for controllably restricting flow therebetween in response to a restriction control signal on line 92. The variable restriction means includes an adjustable valve 94 which is mechanically linked to a stepping motor 96 such that as the stepping motor 96 rotates, the valve setting is altered. Both the stepping motor 96 and the adjustable valve 94 are of conventional design.

A flow measuring means, including a fixed restriction 98 and a differential pressure sensor 100, is provided, with the fixed restriction 98 being connected to the filtrate effluent outlet 88 of the filter means 82 and, through check valve 102, to fluid supply line 10. The differential pressure ssensor 100 provides a flow control signal on line 106 in response to the rate of fluid flow through fixed restriction 98. Sensor 100 may be a conventional pressure sensor, such as Model 228, available from Setra Systems, Natick, Mass. A circuit means 108 is responsive to the flow signal on line 106, and to a reference level signal, for comparing the flow signal and the reference level signal and providing the restriction control signal on line 92 to the variable restriction means, whereby flow is restricted sufficiently through the variable restriction means 90 to provide substantially uniform fluid flow to the fluid supply line 10.

It will be appreciated that by maintaining a uniform flow rate of ink through line 10, the pressure within the print head 12 is held constant regardless of partial clogging of the filter 18 or other restrictions in the fluid supply line 10. As a consequence, a pressure transducer need not be incorporated within the print head, and the problems encountered in prior art printers from particle accumulation around a print head pressure transducer are thus eliminated.

Figure 2:
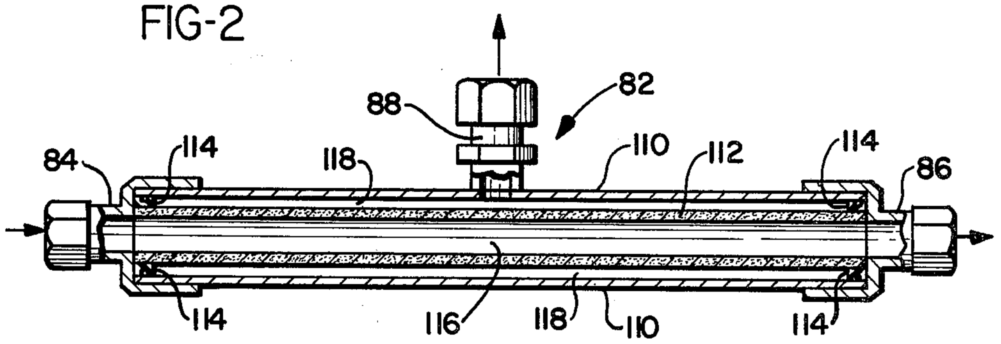
FIG. 2 is a partial sectional view taken along the length of an inertial filter which forms a part of the system of FIG. 1.

Reference is now made to FIG. 2, which illustrates the filter 82 in greater detail. Filter 82 is an inertial filter and includes a filter casing 110 which defines the mainstream influent inlet 84, the mainstream effluent outlet 86, and the filtrate effluent outlet 88. Casing 110 is generally cylindrical in shape and has positioned within it a hollow cylindrical filter element 112 of porous material which extends between the mainstream influent inlet 84 and the mainstream effluent outlet 86. Filter element 112 may be formed of any conventional filter material, such as a wire screen, mesh, porous stainless steel, porous ceramic, or other material. Filter element 112 is centrally positioned within the cylindrical casing 110 by bushings 114. Filter element 112 defines a mainstream fluid path 116 between inlet 84 and outlet 86 and, in conjunction with filter casing 110, defines a filtrate chamber 118 surrounding the filter element 112. The filtrate effluent outlet 88 communicates with the filtrate chamber 118, whereby a portion of the fluid supplied to the mainstream influent inlet 84 passes outward through the filter element 112 to the filtrate effluent outlet 88 and is filtered by the filter element 112. Nonfiltered fluid and particles carried thereby pass out of the filter through the mainstream effluent outlet 86.

Such an inertial filter provides effective filtering of contaminant particles from the filtrate passing through filter element 112, since the inertia of the particles tends to carry them through the mainstream fluid path 116 between inlet 84 and outlet 86. Additionally, this arrangement tends to prevent the filter element 112 from becoming clogged, since the fluid passing through the mainstream fluid path 116 continuously washes and cleans the inner surface of the filter element 112.

Figure 3:
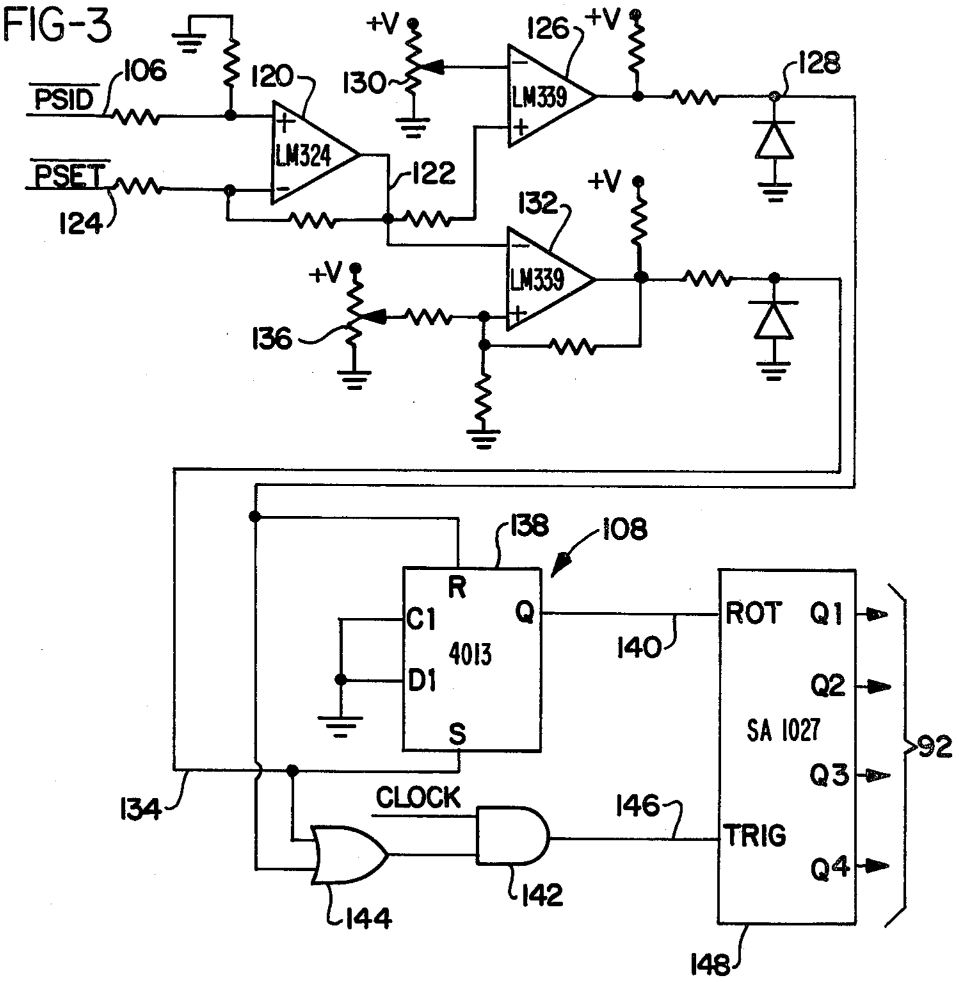
FIG. 3 is an electrical schematic representation of the control circuit which forms a part of the system of FIG. 1.

Reference is now made to FIG. 3, which illustrates the control circuit 108 for monitoring the output of the differential pressure sensor 100 and for controlling the variable flow control valve 94 such that the differential pressure across the fixed restriction means 98 remains substantially constant. The output $\overline{PSID}$ from the sensor means 100 is supplied on line 106 to a summing amplifier 120 which provides a signal on line 122 equal to the difference between the measured pressure differential $\overline{PSID}$ and a desired pressure differential $\overline{\Delta PSET}$ on line 124. The $\overline{\Delta PSET}$ signal is an analog signal representative of a predetermined pressure differential which is to be maintained across the fixed restriction 98. This signal may be provided by a manually adjustable voltage divider circuit or, alternatively, may be provided from an digital-to-analog converter to which is supplied a desired pressure differential in digital form.

It is desired that the difference between $\overline{PSID}$ and $\overline{\Delta PSET}$ be maintained within a certain range, or deadband. To accomplish this, a comparator 126 is provided to supply a high output signal on line 128 when the signal on line 122 exceeds a predetermined positive error level set by voltage divider 130. Similarly, comparator 132 provides a high signal on line 134 when the output of summer 120 is less than a predetermined negative error level determined by voltage divider 136.

A high signal on line 128 causes flip-flop 138 to be reset and the signal on line 140 will thus go low. In like manner, a high signal on line 134 causes flip-flop 138 to be set and the output of line 140 will go high. Simultaneously with setting or resetting flip-flop 138, a high signal on either line 128 or line 134 enables AND gate 142 through OR gate 144 such that clock signals are applied by AND gate 142 to the trigger input 146 of stepping motor control circuit 148. The outputs Q1, Q2, Q3, and Q4 supplied to lines 92 will therefore change state in sequence upon receipt of successive clock pulses on trigger input line 146 so as to cause stepping motor 96 to open or close the valve 94 in dependence upon the output on line 140 from flip-flop 138. When the $\overline{PSID}$ signal on line 106 is sufficiently close to the $\overline{\Delta PSET}$ signal, OR gate 144 is disabled and the stepping motor output 92 therefore remains constant.

It may be desirable to monitor the temperature of the ink being supplied to the print head, especially where substantial ink temperature fluctuations are encountered. It will be appreciated that as the temperature of the ink changes, the viscosity of the ink will also change. This being the case, the flow rate of ink supplied to the print head 12 to maintain a constant pressure within the print head may be varied in order to compensate for such temperature induced viscosity changes. This may be accomplished, for instance, by inserting temperature gauge in the ink supply line and utilizing changes in the temperature responsive output to modify or adjust the ΔPSET signal supplied to line 124 (FIG. 3).

It can be seen, therefore, that the present invention provides a means of supplying filtered ink to the print head of an ink jet printer at a constant flow rate such that the pressure of the ink within in the print head is held constant, regardless of flow restrictions in the fluid supply line to the print head or the associated filters. The print head fluid pressure level is held substantially constant without the need for directly monitoring the pressure level within the print head and, therefore, without the attendant problems of particle collection around a print head pressure sensor probe.

While the form of apparatus herein described constitutes a preferred embodiment of the invention, it is to be understood that the invention is not limited to this precise form of apparatus, and that changes may be made therein without departing from the scope of the invention.

What is claimed is:

1. A system for supplying fluid to the fluid supply line of an ink jet system, comprising a fluid reservoir, pump means having a pump inlet, connected to receive fluid from said fluid reservoir, and a pump outlet, a filter means, including a mainstream influent inlet, a mainstream effluent outlet, and a filtrate effluent outlet, for filtering a portion of the fluid passing between said maintream influent inlet and said mainstream effluent outlet and providing the fluid so filtered to said filtrate effluent outlet, said mainstream influent inlet being connected to said pump outlet, variable restriction means, connecting said mainstream fluid outlet to said pump inlet, for controllably restricting flow therebetween in response to a restriction control signal, flow measuring means for connecting said filtrate effluent outlet of said filter means to said fluid supply line of said ink jet printer and for providing a flow signal in response to fluid flow therethrough, and means, responsive to said flow signal and to a reference level signal, for comparing said flow signal and said reference level signal and providing said restriction control signal to said variable restriction means, whereby flow is restricted sufficiently through said variable restriction means to provide substantially uniform fluid flow to said fluid supply line.

2. The system of claim 1 in which said pump means comprises:

a second filter connected to said pump outlet, and a pump, connected to said pump inlet, providing fluid to said second filter, whereby fluid circulating through said filter means, said variable restriction means, and said pump means is continuously filtered.

3. The system of claim 1 in which said filter means comprises an inertial filter, including a filter casing defining said mainstream influent inlet, said mainstream effluent outlet, and said filtrate effluent outlet, and a hollow cylindrical filter element of porous material extending between said mainstream influent inlet and said mainstream effluent outlet and defining a mainstream fluid path therebetween, said filter element and said filter casing defining a filtrate chamber surrounding said filter element, said filtrate effluent outlet communicating with said filtrate chamber, whereby a portion of the fluid supplied to said mainstream influent inlet passes outward through said filter element to said filtrate effluent outlet and is filtered by said filter element, while nonfiltered fluid and particles carried thereby pass out of said filter means through said mainstream effluent outlet.

4. An ink jet system, comprising:

print head means for producing a plurality of ink jet drop streams, accumulator means for storing a supply of ink, recirculating ink supply means, including fluid pump means having an inlet and an outlet, with said inlet being connected to said fluid reservoir means, inertial filter means connected to receive ink from said fluid pump means, said inertial filter means having a main inlet, a main outlet, and a filtrate outlet, with its main inlet being connected to said pump means, and a variable flow control valve connected between said main outlet of said inertial filter means and said inlet of said pump means, whereby ink continuously recirculates from said pump means through said inertial filter means, and said variable flow control valve, fixed restriction means, connected to said filtrate outlet of said inertial filter means, for receiving filtered fluid therefrom, pressure differential sensor means, connected across said fixed restriction means, for measuring the pressure differential thereacross, and providing an output signal, a fluid supply line, connecting said fixed restriction means and said print head means, for supplying filtered ink under pressure to said print head means, and control means for monitoring the output of said pressure differential sensor means and for controlling said variable flow control valve such that said pressure differential across said fixed restriction means remains substantially constant.

5. The ink jet system of claim 4, in which said fluid pump means comprises:

a second filter connected to said pump outlet, and a pump, connected to said pump inlet, providing fluid to said second filter, whereby ink circulating through said inertial filter means, said variable flow control valve, and said fluid pump means is continuously filtered.

6. The system of claim 4 in which said inertial filter means comprises:

a filter casing defining said main inlet, said main outlet, and said filtrate outlet, and a hollow cylindrical filter element of porous material extending between said main inlet and said main outlet and defining a fluid path therebetween, said filter element and said filter casing defining a filtrate chamber surrounding said filter element, said filtrate outlet communicating with said filtrate chamber, whereby a portion of the ink supplied to said main inlet passes through said filter element to said filtrate outlet.

7. A system for supplying printing fluid to an ink jet printer, comprising:

a mainstream line, a fluid reservoir for supplying said printing fluid to said mainstream line, pump means connected for pumping said printing fluid through said mainstream line, a fluid supply line for carrying printing fluid from said mainstream line to said printer, connection means within said mainstream line for passing a major portion of said printing fluid therethrough and diverting a minor portion of said printing fluid into said fluid supply line, variable restriction means within said mainstream line for controllably restricting flow therethrough in response to a restriction control signal, flow measuring means within said fluid supply line for generating a flow signal corresponding to the rate of fluid flow therethrough, and control means for generating said restriction control signal in response to said flow signal, whereby fluid flow within said mainstream line is controlled to provide substantially uniform fluid flow to said fluid supply line.

8. A fluid supply system according to claim 7 wherein said connection means comprises a filter.

9. A fluid supply system according to claim 8 wherein said filter comprises a filter inlet for receiving all of the fluid flowing through said mainstream line, a main filter outlet for discharging said major fluid portion into said mainstream line, inertial separating means for diverting said minor fluid portion from the mainstream flow and concomitantly filtering the fluid so diverted, and a filtrate outlet for delivering said filtered fluid into said supply line.

10. A fluid supply system according to claim 9 wherein said pump comprises a pump outlet connected for supplying printing fluid to said filter inlet and a pump inlet connected for receiving fluid from said reservoir and from said main filter outlet.

11. A fluid supply system according to claim 10 and further comprising a second filter connected between said pump outlet and said filter inlet.

12. A fluid supply system according to claim 11 wherein said reservoir is connected for receiving surplus fluid from said ink jet printer.

* * * * *